J. M. Walker,
Hay Fork.
No. 92,495.
Patented July 13, 1869.
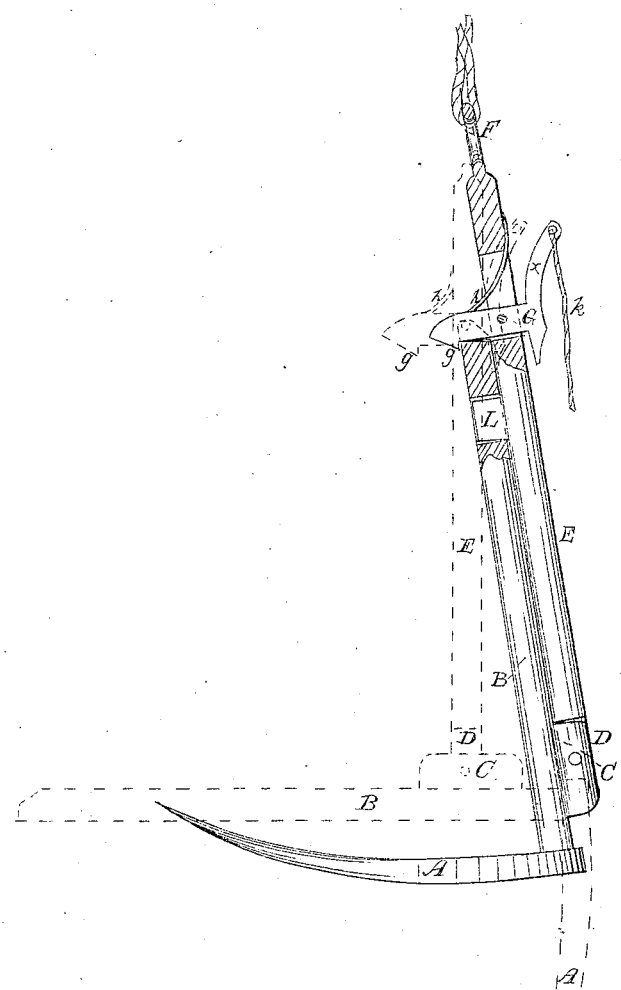
Witnesses.
Inventor:
Jno. M. Walker,
by Prindle and Dyer, Att'ys.

United States Patent Office.

JOHN M. WALKER, OF ROSSVILLE, PENNSYLVANIA, ASSIGNOR TO HIMSELF AND JOHN C. HOLLINGER, OF SAME PLACE.

Letters Patent No. 92,495, dated July 13, 1869.

IMPROVEMENT IN HORSE HAY-FORKS.

The Schedule referred to in these Letters Patent and making part of the same.

*To all whom it may concern:*

Be it known that I, JOHN M. WALKER, of Rossville, in the county of York, and in the State of Pennsylvania, have invented certain new and useful Improvements in Horse Hay-Forks; and do hereby declare that the following is a full, clear, and exact description thereof, reference being had to the accompanying drawings, making a part of this specification, in which is represented a side elevation of a fork, with the front half of the upper portion removed, for the better illustrating the construction of the locking-devices.

My invention relates to a class of hay-forks, having the tines so suspended as to permit of their being tilted or dropped from a horizontal to a vertical position; and It consists in the construction and manner of suspension of said fork, and in the construction and arrangement of the locking and releasing-devices, as is fully described hereinafter.

In the annexed drawing—

A represents the tines of the fork, which are joined together at their rear ends, and also to the lower end of a round bar, B, forming the shank of said fork.

Secured to the rear of said shank B, near its lower end, are two ears C, between which is a space of sufficient width to receive a tongue, D, upon the lower end of a bar, E, said tongue being pivoted within ears by means of a bolt or rivet, $c$, passing through both ears and tongue.

The bar E corresponds in size and shape with the shank B, above which it extends, and has upon its upper end an eye, F, to which the rope or other device for suspending the fork is attached.

Immediately above the upper end of the shank B is a slot, passing through the centre of the bar E, in a line with the centre of said shank, in which is pivoted an angular lever or catch, G, the horizontal arm of which projects forward over the end of said shank, and is provided with a lip, $g$, extending downward, so as to embrace the front side of said shank, and hold it against said bar.

The lower end of the catch is inclined upward from the lip $g$, so as to permit of its being raised by the end of the shank when it is pressed toward the rod E.

A spring, $h$, is secured at one end to the bar, and its other end is caused to press upon the outer end of the catch, for the purpose of counterbalancing the weight of a cord, $k$, which is secured to an eye in the vertical arm $x$ of said catch, and is used for operating the same, so as to release the shank.

In order that the ears C and catch G may be relieved from all lateral strain, a dowel, L, is secured to and projects forward from the rod E, near the upper end of the shank, in the latter of which is a slot corresponding in size and shape to said dowel, so that when said shank and rod are shut together, the dowel enters and fills said slot, and holds them firmly together laterally.

The operation of this device is easily understood. The fork being locked together, (as shown by the black lines in the drawing,) the tines are caused to enter the hay and secure a load, and the fork then elevated to the desired height and position, when, by pulling upon the cord $k$, the catch G is raised, releasing the upper end of the shank, which falls down, carrying with it the tines, (as shown by the red lines,) and liberates the load.

I am aware that the general features of this fork are not new, and consequently disclaim all, except the specific devices set forth in the appended claim.

Having thus fully set forth the nature and merits of my invention,

What I claim as new, and desire to secure by Letters Patent, is—

The within-described hay-fork, consisting of the tines A, shank B, ears C, bar E, catch G, and dowel L, when constructed and arranged substantially as and for the purpose specified.

In testimony that I claim the foregoing, I have hereunto set my hand, this 14th day of May, 1869.

JOHN M. WALKER.

Witnesses:
M. T. URICH,
H. H. SPINGLER.